INVENTOR.
FRANK N. NOLAN
BY E. H. Schmidt
ATTORNEY.

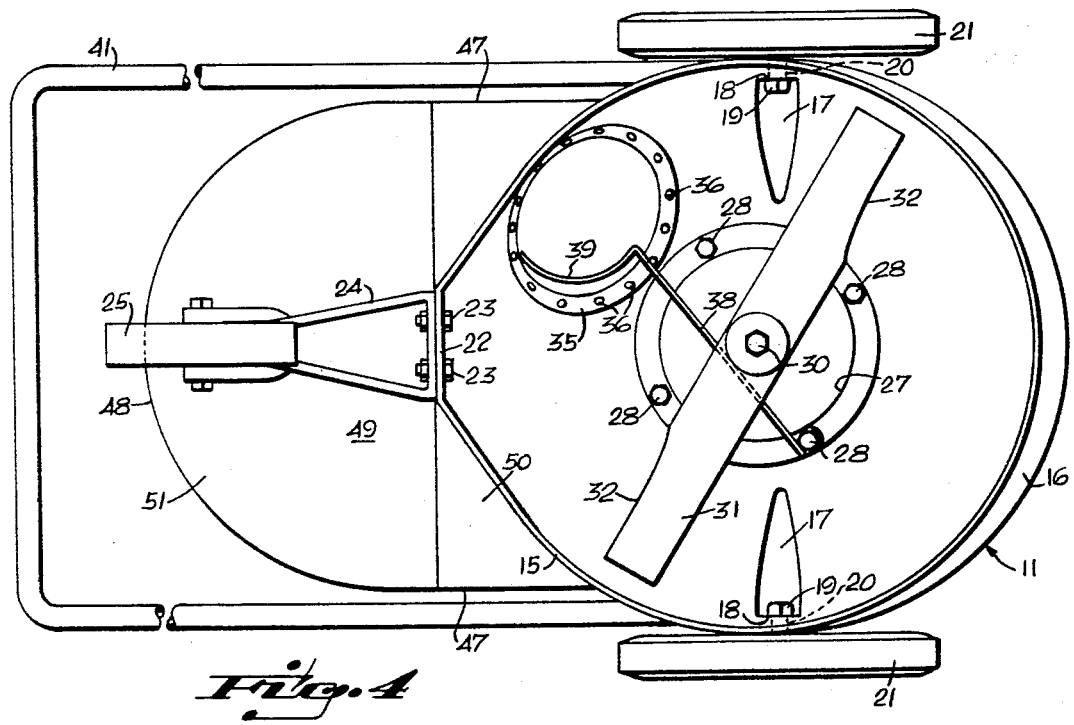

United States Patent Office 3,398,514
Patented Aug. 27, 1968

3,398,514
POWER MOWER WITH GRASS CATCHER
Frank N. Nolan, 1630 44th St.,
West Palm Beach, Fla. 33407
Filed Apr. 28, 1966, Ser. No. 545,938
10 Claims. (Cl. 56—25.4)

My invention relates generally to lawn mowers, and is directed particularly to improvements in rotary power lawn mowers of the type including grass and debris catching means.

Rotary lawn mowers equipped with catches for automatically collecting grass, leaves, twigs and other debris as a lawn is mowed are known. Such catcher devices used in combination with rotary lawn mowers as have heretofore been devised have found only limited acceptance, however, for a number of reasons, principal among which is their bulkiness beyond the perimeter of the cutter housing, and consequent interference with use of the mower close to buildings, shrubbery and the like. Other disadvantages are their complexity, inefficiency, their interference with the proper balance of the mower for ease of operation, and their high cost of manufacture.

It is, accordingly, the principal object of this invention to provide an improved rotary mower-grass catcher combination that obviates the above-mentioned deficiencies of mower-catcher devices heretofore known.

It is a more particular object to provide a rotary lawn mower of the character described wherein the housing is generally circular in shape and provided with a pair of diametrically-opposed main support wheels between which the rotary cutter blade drive motor is mounted, and an outrigged castor wheel at the back for support with maximum maneuverability, and wherein a rigid grass catcher is removably positioned on the housing between the motor and the support bracket without extending beyond and interfering with the operational zones at either side of the mower.

Still another object is to provide a rotary lawn mower-catcher combination of the character described wherein the motor is so mounted that its center of gravity lies substantially forward of the transverse axis of the main support wheels, and wherein the catcher is of such weight and so closely positioned to the motor that the resultant center of gravity for the whole machine will lie substantially over the main wheels, the center of gravity shifting little between full and empty conditions of the catcher.

Yet another object is to provide a mower of the character above described that includes improved mechanism for directing and blowing grass and debris up into the catcher.

Another object is to provide a mower of the character described which will be simple in structure, inexpensive to manufacture, compact, fool-proof in operation, and safe, dependable and durable in use.

Other objects, features and advantages of the invention will be apparent from the following description when read with reference to the accompanying drawings. In the drawings, wherein like reference numerals denote corresponding parts throughout the several views:

FIG. 4 is a bottom view thereof;

FIG. 5 is a transverse cross-sectional view taken along the line 5—5 of FIG. 3; and FIG. 6 is a partial longitudinal cross-sectional view, similar to FIG. 3 but illustrating a modified form of grass catcher.

Figure 1:
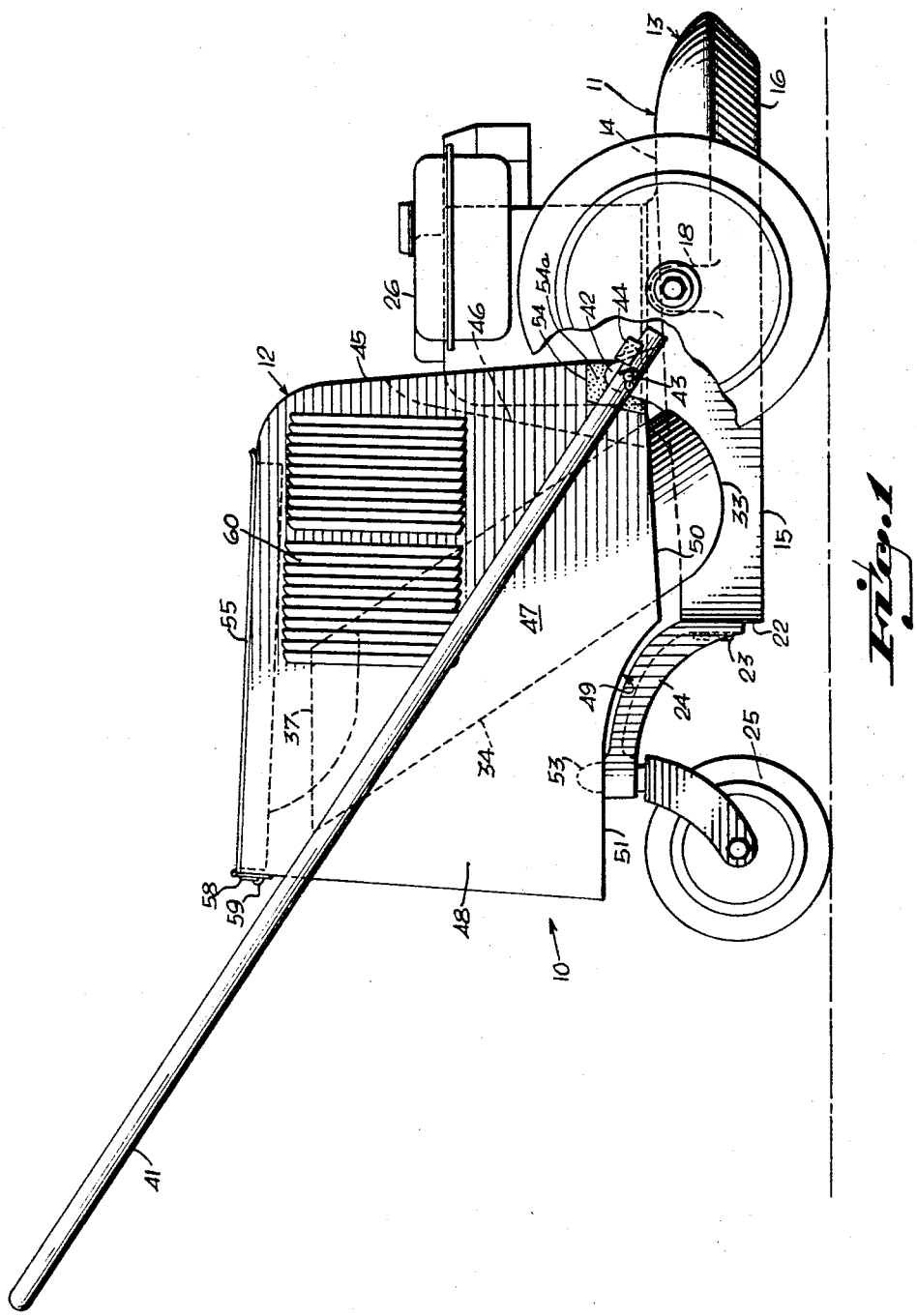
FIG. 1 is a side elevational view of a combination rotary mower-grass catcher embodying the invention.
Figure 2:
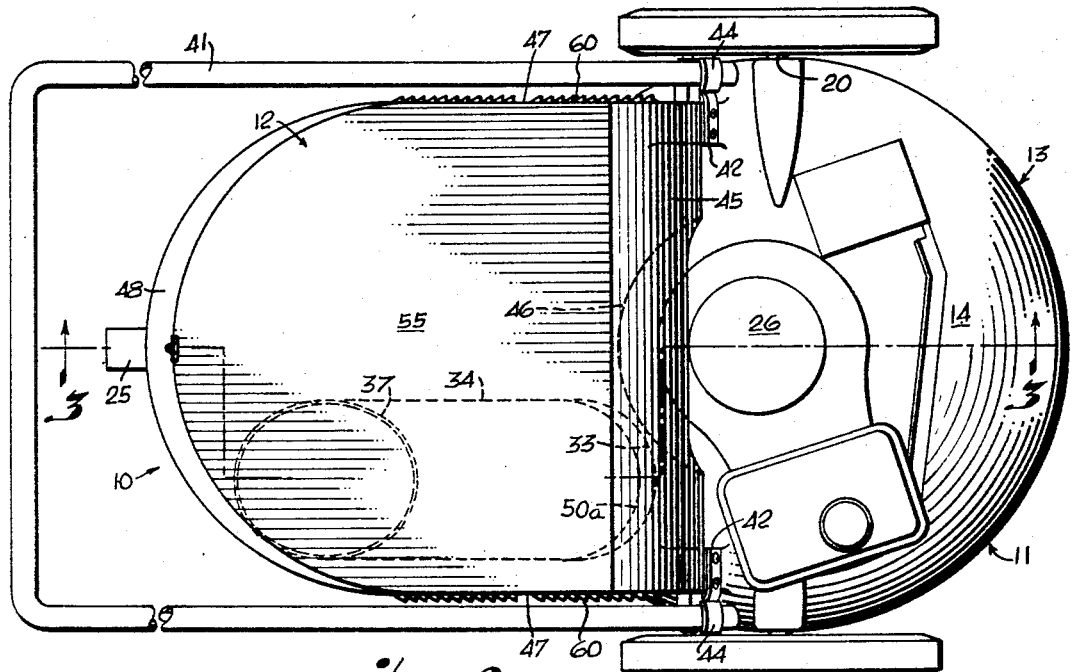
FIG. 2 is a top view thereof.
Figure 3:
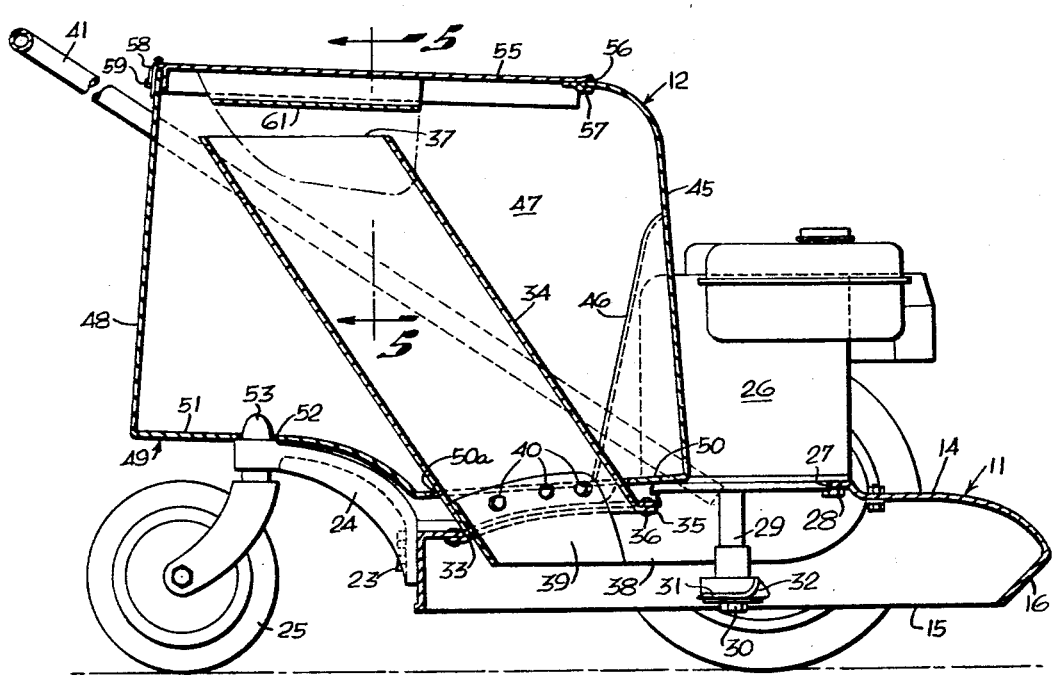
FIG. 3 is a longitudinal cross-section thereof, taken along the line 3—3 of FIG. 2 in the direction of the arrows.

Referring now in detail to the drawings, 10 in FIGS. 1, 2, 3 and 4 designates an improved mower-catcher embodying the invention, the same comprising, generally, a mower 11 and a removable catcher 12. The mower 11 comprises a generally circular housing 13, preferably of cast metal, having an upper deck 14, slightly concavely rounded and integrally formed with a downwardly-extending peripheral skirt 15. As best illustrated in FIGS. 1 and 3, the front portion of the housing skirt 15 is inwardly inclined to provide an angular lip 16, which serves to pass over leaves and debris easily rather than to push them to the side as the mover moves forward.

As illustrated in FIG. 4, the upper deck 14 of the housing is formed at each side, just forward of the transverse diameter thereof, with a pair of opposed, elongated recesses 17 extending upwardly from the underside to provide vertical wall portions 18 through which are secured, as by nuts 19, shaft 20 journalling a pair of main wheels 21. The housing 13 at its rear end is formed with a short, flat, central skirt portion 22 to which is secured, as by bolts 23, a rearwardly-extending and upwardly-curved outrigger arm 24 the outer end of which supports a castor wheel 25.

Centrally mounted upon the upper deck 14 of the housing is a gasoline motor 26, said motor being secured over a central opening 27 in said deck as by bolts 28. The motor 26 is positioned so that the greater part of its bulk is directed forwardly, with the result that the center of gravity of the motor will lie slightly forwardly of the transverse axis of the main wheels 21. As illustrated in FIGS. 3 and 4, there is centrally affixed to the drive shaft 29 of the motor 26, as by a bolt 30, an elongated cutter blade 31 the outer end portions of the trailing edges of which are curved upwardly, as indicated at 32, to provide upwardly-directed blower action as the blade is rotated in the anti-clockwise direction as seen in FIG. 4.

At one side of the back of the upper deck 14 of the housing 13 there is provided an opening 33, preferably round, peripherally affixed with respect to which is the lower end of an upwardly and rearwardly-directed conveying tube 34, which may be of sheet metal, for example. To secure the tube 34 in place, its lower end is formed with a flange 35, which flange is riveted to the housing deck as by rivets 36. The upper end of the conveying tube 34 is cut at an angle to provide an upper edge 37 lying in a substantially horizontal plane. As a means for directing air blown by the cutter blade 31 up into the conveying tube 34, a deflector plate 38 is provided between the underside of the housing upper deck 14 and the top of said blade, said deflector plate having an arcuate wall portion 39 arranged about that portion of the tube opening 33 which the blade last passes in its rotary movement. It will thus be apparent that air blown by the blower action of the blade 31 and up through the conveyor tube 34 as directed by the deflector plate 38, will create a strong suction within the underside of the housing 13 so that grass, leaves, twigs and other debris in the path of travel of the mower will be drawn up through the conveyor tube 34. The deflector plate 38 may be held in place by attachment to a mounting bolt 28 for the motor at one end, and by bolts 40 securing the conveyor tube 34 at the other end. The deflector plate can readily be removed for repair or replacement if necessary.

The mower 11 is provided with a U-shaped tubular handle 41 which straddles the catcher 12 at each side of the machine and is pivotally connected to opposed, upwardly-extending lugs 42 integrally formed in the upper deck of the housing 13 as by journalling pins 43. Independent downward swinging of the handle 41 with respect to the housing is limited by abutment arms 44 fixed against the forward surfaces of the lugs 42 and extending sidewardly outwardly thereof. As best illustrated in FIG. 1 the outer end portions of the handle 41 extending beyond their pivot points abut the undersides of the abutment arms 44 at the lowermost position of the handle.

The catcher 12, which may be of sheet metal or a fiberglass reinforced synthetic plastic, for example, is formed with a front wall 45 the lower central portion of which has an arcuate depression 46 to partially envelope the motor 26, as illustrated in FIGS. 1 and 2. The catcher 12 is further integrally formed with spaced side walls 47 which merge at the rear end of the catcher into an arcuate back wall 48. The bottom wall 49 is substantially flat at its forward end, as indicated at 50, to rest upon the upper deck 14 of the mower housing, and at its rear end is curved upwardly as indicated at 51 to clear the outrigger arm 24 of the castor wheel 25. As illustrated in FIG. 3, the bottom wall 49 is provided at its forward end with a round opening 50a through which the conveying tube 34 extends when the catcher 12 is assembled upon the mower 11.

As a means for removably supporting the catcher 12 in place, the upwardly-curved rear end portion 51 of the catcher bottom wall 49 has a central round opening 52 which indexes over a rounded, upwardly-projecting journal hub 53 formed at the outer end of the outrigger arm 34. As additional locating means, the front lower corners of the catcher 12 are formed with recesses 54 fitted with resilient cushions 54a contoured to fit over the lugs 42 on the upper deck 14 of the housing 13.

A removable top cover 55 fits over the opening at the top of the catcher 12, said cover being held in place at the front as by a groove 56 in front received within which is a rearwardly-projecting marginal upper end portion 57 of the catcher front wall 12. The rear end of the top cover is secured in place by any fastening means, such as a hinged hasp 58 cooperative with a staple 59 fixed to the back wall 48 of the catcher. Forwardly-directed louvers 60 are formed in the catcher side walls 47 for discharging air blown up through said tube away from the operator.

As is best illustrated in FIGS. 3 and 5 an arcuate deflector plate 61 is fixed against the underside of the top cover of the catcher 12 as by a bracket 62, said deflector plate being so positioned in vertically spaced relation over the upper end of the conveying tube 34 as to redirect air and debris down into the front portion of the catcher. The deflector plate 61 also serves as a shield to protect against the possibility of damage being caused by small objects which may from time-to-time be propelled up the conveying tube at high velocities.

It will be understood that when the catcher 12 becomes full, it will be a simple matter to lift it up and away from the mower and off the conveying tube 34, after which it can be conveniently emptied simply by removing the cover 55.

FIG. 6 illustrates a modification of the invention, differing from that of FIGS. 1 through 5 described above only in that the conveying tube 34a, instead of being fixed with respect to the mower 11, is fixed with respect to the catcher 12a by means of a collar 63 surrounding the opening 50b in the bottom portion 50 of said catcher, said collar being fixed to said bottom portion as by rivets 64. As illustrated in FIG. 6, when the catcher 12a is in place, an outwardly-projecting lower end portion of the conveying tube 34a communicates in close registration with an opening 33a of the mower housing.

In use, debris conveyed and deposited in the catcher 12 or 12a will gradually build up from the front portion of the catcher where its weight distribution least effects the handling characteristics of the mower. Even when completely full, the combined weight distribution with respect to the main wheels is such as will have no noticeable effect in the operation of the mower. The compactness of the catcher, moreover, not only makes for easy handling, but also has no limiting effect on the manuverability of the mower, with the result that close cutting to shrubbery, building walls and the like obstructions can be accomplished as easily as if the mower were not equipped with the catcher.

While I have illustrated and described herein only two forms in which my invention can conveniently be embodied in practice, it is to be understood that these forms are presented by way of example only and not in a limiting sense. The invention, in brief, includes all the forms and embodiments coming within the scope and spirit of the following claims.

What I claim as new and desire to secure by Letters Patent is:

1. In a rotary power mower-grass catcher combination, the combination comprising, a generally circular housing member having an upper deck portion and a downwardly-extending peripheral skirt, a pair of main support wheels, means journalling said support wheels at diametrically-opposed side portions of said housing member, a drive motor mounted centrally upon said upper deck portion of said housing member and having a drive shaft projecting vertically through a central opening in said upper deck portion, an elongated cutter blade centrally affixed to said drive shaft at the underside of said upper deck portion for rotation in a plane perpendicular to the rotational axis of said drive shaft, outer edge portions of the trailing edges of said cutter blade being curved upwardly in the direction of the underside of said upper deck portion to provide upwardly-directed blower action as the blade is rotated, an auxiliary wheel, mechanism journalling said auxiliary wheel with respect to sad housing at a position to the rear of said diametrical axis of said pair of main support wheels, a catcher having a bottom wall, front and back walls and side walls and having an opening at the top, a cover removably attached to said catcher and adapted to close said opening means for removably supporting said catcher upon said upper deck portion at a position above and between said drive motor and said auxiliary wheel, and conduit means communicating between the underside of said upper deck and the interior of said catcher for conveying grass and debris blown by the blower action of said cutter blade.

2. A rotary power mower-grass catcher combination as defined in claim 1 wherein said conduit means comprises a conveyor opening in said upper deck, a conveying tube having a lower end fixed about said conveyor opening and being in communication therewith, the upper end of said conveying tube being inclined to the rear of said housing member, said bottom wall of said catcher having an opening for passage therethrough of said conveying tube.

3. A rotary power mower-grass catcher combination as defined in claim 1 wherein said conduit means comprises a conveyor opening in said upper deck, a second conveyor opening in said bottom wall of said catcher, a conveying tube fixed within said catcher and having one end in communication with said second conveyor opening, said second conveyor opening being in communicating register with said conveyor opening in said upper deck when said catcher is supported on said upper deck.

4. A rotary power mower-grass catcher combination as defined in claim 2 including an arcuate deflector affixed with respect to said catcher cover and operative to redirect downwardly any debris being blown up through said conveying tube.

5. A rotary power mower-grass catcher combination as defined in claim 3 including an arcuate deflector affixed with respect to said catcher cover and operative to redirect downwardly any debris being blown up through said conveying tube.

6. A rotary power mower-grass catcher combination as defined in claim 2 including an arcuate deflector plate removably affixed with respect to the underside of said upper deck and in partially surrounding relation with respect to said conveyor opening in said upper deck.

7. A rotary power mower-grass catcher combination as defined in claim 3 including an arcuate deflector plate removably affixed with respect to the underside of said upper deck and in partially surrounding relation with respect to said conveyor opening in said upper deck.

8. A rotary power mower-grass catcher combination as defined in claim 1 wherein said auxiliary wheel journalling mechanism comprises an outrigger bracket arm secured with respect to a rear portion of said housing member and extending perpendicularly rearwardly with respect to the common axis of said main support wheels, said auxiliary wheel being castered with respect to the outer end of said support bracket.

9. A rotary power mower-grass catcher combination as defined in claim 8 wherein the front wall of said housing is recessed to receive said motor in partially enclosing relation.

10. A rotary power mower-grass catcher combination as defined in claim 1 wherein said peripheral skirt at the front of said housnig member is inwardly inclined.

References Cited
UNITED STATES PATENTS

| | | | |
|---|---|---|---|
| 2,990,666 | 7/1961 | Blume | 56—25.4 |
| 3,134,214 | 5/1964 | Shaw | 56—202 |
| 3,188,787 | 6/1965 | Weiland | 56—25.4 |
| 3,191,370 | 6/1965 | Epstein | 56—202 |

RUSSELL R. KINSEY, *Primary Examiner.*